United States Patent [19]

Brandreth, III

[11] Patent Number: 5,580,448

[45] Date of Patent: Dec. 3, 1996

[54] CHEMICAL DISPENSER

[76] Inventor: John B. Brandreth, III, P.O. Drawer 1068 158 Railroad St., Canton, Ga. 30114

[21] Appl. No.: 580,324

[22] Filed: Dec. 28, 1995

[51] Int. Cl.⁶ .................................................. B01D 11/02
[52] U.S. Cl. .......................... 210/206; 210/205; 137/268; 422/276; 422/277; 422/264
[58] Field of Search ...................... 422/264, 276, 422/277; 210/206, 205, 209; 137/268

[56] References Cited

U.S. PATENT DOCUMENTS

| | | | |
|---|---|---|---|
| 2,135,932 | 11/1938 | Belmont | 422/277 |
| 2,955,923 | 10/1960 | Atkinson | 422/277 |
| 3,306,709 | 2/1967 | Atkinson | 422/277 |
| 3,442,800 | 5/1969 | Jasionowski | 210/206 |
| 3,887,468 | 6/1975 | Bray | 210/206 |
| 4,059,522 | 11/1977 | Polley et al. | 422/277 |
| 4,347,224 | 8/1982 | Beckert et al. | 422/277 |
| 4,780,197 | 10/1988 | Schuman | 210/206 |
| 5,053,206 | 10/1991 | Maglio et al. | 422/276 |
| 5,181,533 | 1/1993 | Kooi | 422/276 |
| 5,507,945 | 4/1996 | Hansen | 422/277 |

Primary Examiner—Cynthia L. Nessler
Attorney, Agent, or Firm—Thomas C. Saitta

[57] ABSTRACT

A device for delivering chemical solutions into a liquid flow, where said chemical solution is created by dissolving solid chemical contained within a chemical cartridge, the device comprising a base member and housing connected into a fluid flow line such that liquid flows into the base member, into the housing and back out through the base member, and further comprising a chemical dispenser having an upper conduit member, an apertured midsection and a chemical containing lower cartridge, the cartridge having an intake aperture located on the upper portion of its side wall and a dispensing aperture on its top, such that a saturated chemical solution is formed in said cartridge and passes into the liquid flow through the dispensing aperture due to the pressure differential of the liquid flowing into the apertured midsection and through the upper conduit out of the device.

14 Claims, 2 Drawing Sheets

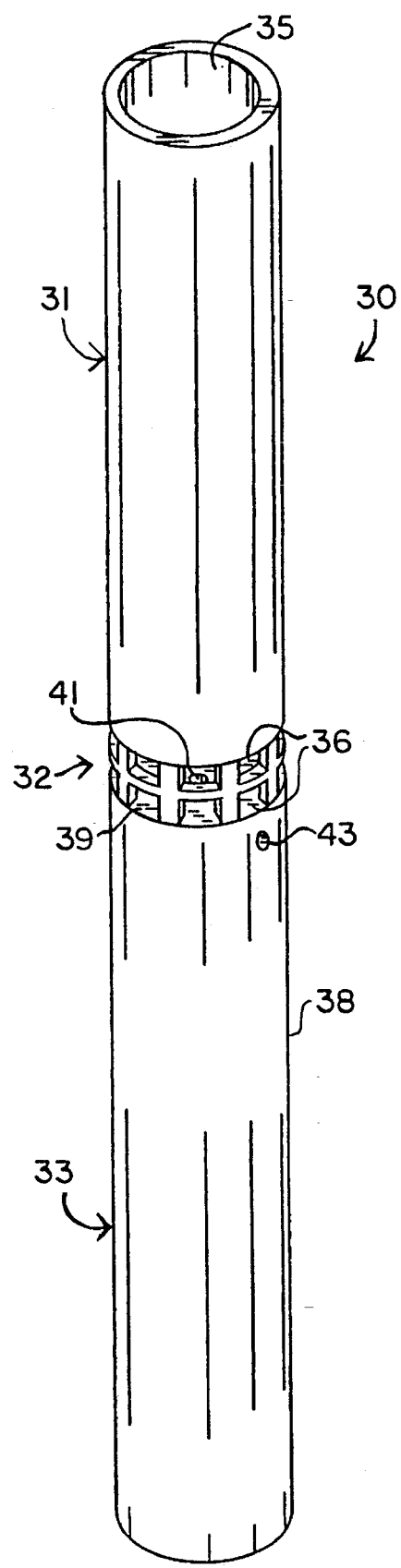

CHEMICAL DISPENSER

BACKGROUND OF THE INVENTION

This invention relates generally to the field of dispenser devices used to introduce into a flowing liquid small quantities of a chemical solution created by dissolving a solid or granular chemical. More particularly, the invention relates to such devices to be used as a component in assemblies of the type commonly used for filtration of water in circulation or supply systems, where the rate of introduction of the dissolved chemical into the water is controlled in a manner related to the flow volume of the water stream to insure proper concentration percentage.

It is desirable or necessary in many water supply or recirculation systems, such as water for household or industrial use, or water for use in spas and pools, to add certain chemicals to the water to control bacteria or fungal growth, corrosion, scale deposits, etc. Commonly known additives include chlorine, polyphosphate or sodium silicate. Such additives are typically supplied in solid or granular form for ease of handling, and must therefore be dissolved in liquid and introduced into the water flow. It is imperative that the chemical additives be supplied in the proper concentration, and it is important that the mechanism for adding the chemical solutions provide for proper rate introduction with little variation in concentration. Many conventional systems fail these criteria, the mechanisms being unable to prevent variations in concentration and introduction rates, especially in circumstances where the water flow is not continuous and varies in pressure.

The most simplistic solid chemical additive mechanisms simply divert all or a portion of the water flow stream through a container holding the solid chemical. The water flowing from the container will include an amount of dissolved chemical. These devices suffer from lack of dispensing control, since the amount of chemical present in the outflow is dependent on the volume of solid chemical in the container. As that volume decreases, the concentration of dissolved chemical in the outflow also decreases. Additionally, this type of system produces a highly concentrated chemical surge when water flow is resumed after being shut off for a period of time. Finally, variation in the water flow rate will not correspondingly alter the dissolving rate of the chemical, producing incorrect concentration amounts in the outflow.

Attempts have been made to develop a mechanism which addresses the problems encountered in correctly metering and controlling the chemical introduction and concentration rates, but known systems are either overly complicated or do not fully solve all the problems set forth above. A complicated mechanism is described in U.S. Pat. No. 4,780,197 to Schuman, which discloses a flow-through chemical dispenser cartridge positioned within the internal core of a filter which requires one or more operational valves to perform effectively. A more simplified approach is shown in U.S. Pat. No. 4,347,224 to Beckert et al. This patent discloses a flow housing which contains an internally mounted chemical cartridge. A small amount of the water flow is diverted into the bottom of the chemical cartridge and the chemical solution is drawn through a small aperture in the top of the cartridge by the pressure differential created by the flow of the bulk of the water passing through the housing. This apparatus provides a simple approach to solving the problems encountered in standard solid chemical systems, but the mechanism is just a variation of the standard system where a portion of the water stream is passed through the solid chemical before being returned to the main flow stream. The distinction in Beckert et al. is that the cartridge containing the solid chemical is mounted internal to a large housing through which all the water flows. The sizing of the cartridge is such to create an annular passage down to the bottom of the chemical cartridge, where the water flows through a plurality of liquid inlet holes, past the chemical and out the liquid outlet hole. In effect, the annular passage is just a substitute for a small bypass conduit as found in many old systems, and the problems associated with variations in concentration and surging would still be present.

It is an object of this invention to provide a dispenser mechanism which provides a steady state concentration of dissolved chemical, which introduces the chemical solution into the main water stream in amounts directed related to water flow rate or volume to maintain precise percentages of chemical solution, which does not produce excessive chemical concentration during periods of no water flow, and which does not introduce excessive amounts of dissolved chemical when water flow is resumed. It is an object to provide such a device where the cartridge containing the solid chemical is not a flow through cartridge, such that water is not passed through the solid chemical. It is an object to provide such a device where the chemical cartridge can be used alone or in combination with a hollow core filter.

SUMMARY OF THE INVENTION

The invention comprises a dispensing device which is incorporated within a flow-through, fixed base member having an inlet opening connected to a water supply conduit, an outlet opening connected to a water outflow conduit, and an annular mounting flange adapted to receive a generally cylindrical, hollow, open top housing. A down flow opening in the fixed base diverts water from the inlet opening into the cylindrical housing, and a centrally located up flow opening in the fixed base receives water from the cylindrical housing and directs it through the outflow opening and into the outflow conduit. The cylindrical housing is adapted to receive a centrally positioned, generally tubular dispensing mechanism comprising a lower portion chemical cartridge having a closed bottom, a side wall having a relatively small opening into the interior of the cartridge positioned near the top of the side wall, a top wall having a relatively small opening into the interior of the cartridge, within which is deposited the solid or granular chemical additive, an upper conduit portion having an open bottom and top, the open top being adapted to mate with the fixed base around the upflow opening, and an apertured mid-section having relatively large openings for large volume water flow. The cylindrical housing may also contain a hollow core filter, typically pleated, which surrounds the dispensing mechanism and abuts the bottom of the fixed base and the interior bottom of the cylindrical housing such that all water must flow pass through the filter to exit the housing.

Once the dispensing device is installed into the housing and fixed base and water flow is initiated, the pressure differential caused by the large volume flow of water into the apertured mid-section and across the small opening in the top of the chemical cartridge draws a small amount of dissolved chemical solution through the small top opening and into the main water flow stream, while simultaneously drawing an equally small amount of water into the upper interior of the chemical cartridge to replace the suctioned chemical solution. Because the chemical cartridge has only two, relatively small openings in relation to the internal volume of the chemical cartridge, the solution contained within the cartridge portion of the dispensing device becomes chemically saturated within a short time after water is first introduced into the housing. The solution within the chemical cartridge remains saturated even when water flow is occurring, since the amount of water drawn into the small side opening to replace the amount of chemical solution drawn out of the small top opening is proportionately small relative to the total volume of the saturated solution contained within the chemical cartridge. Because the solution in the cartridge is saturated, there will be no change in concentration during periods when no water flow is occurring.

BRIEF DESCRIPTION OF THE DRAWINGS

FIG. 2 is a perspective view of the dispensing mechanism.

DETAILED DESCRIPTION OF THE INVENTION

Figure 1:
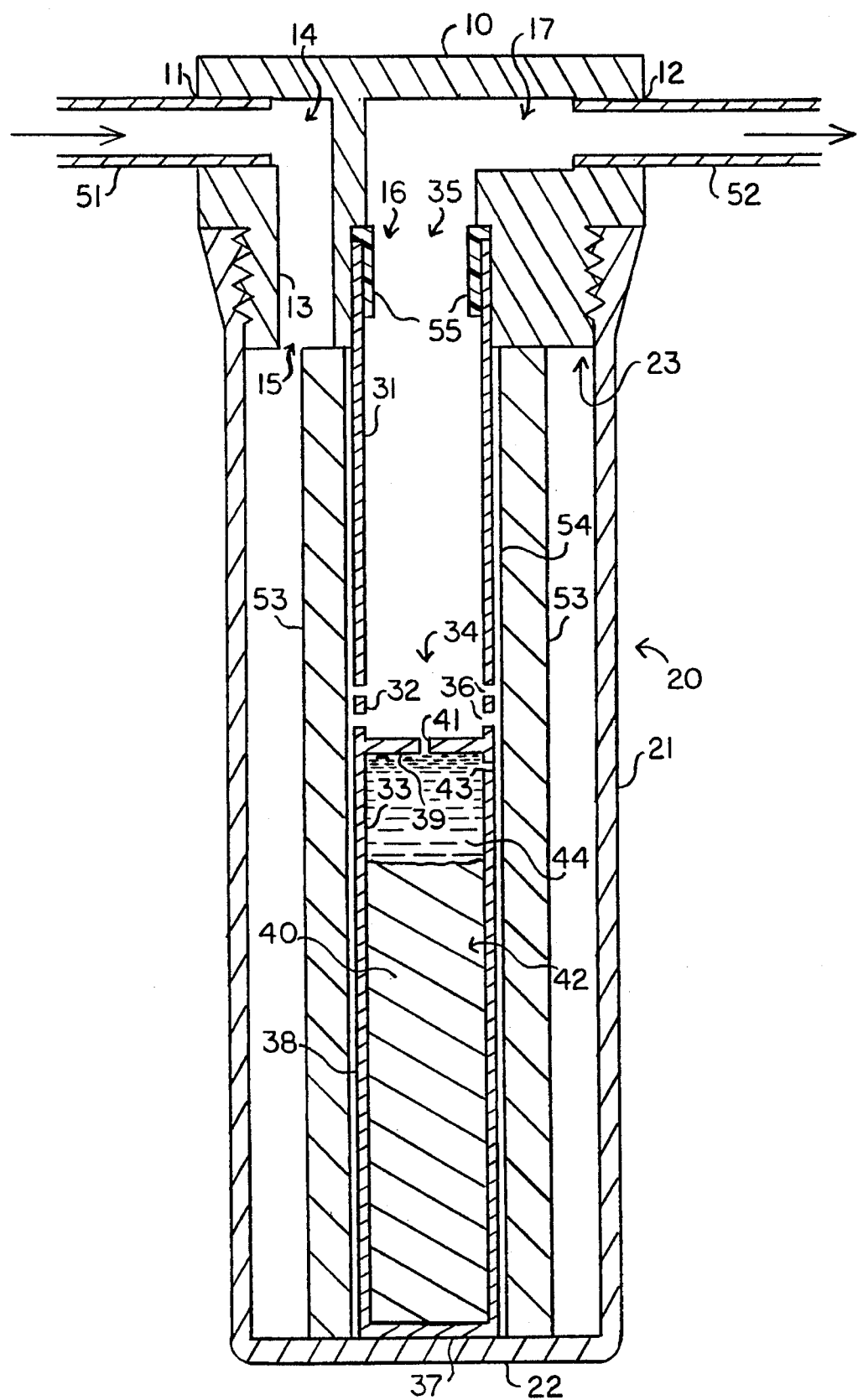
FIG. 1 is a cross-sectional view of the dispensing mechanism mounted within a flow-through filter inside a cylindrical housing and fixed base member.

The invention will now be described in detail, in conjunction with the drawings, with regard for the best mode and preferred embodiment. The invention is a chemical dispenser for introducing a chemical solution of predetermined concentration and amount into a flow of liquid, the dispenser being incorporated within an adjoined housing and flow-through fixed base connected to inflow and outflow conduits of a water or other liquid delivery system, such as found in a residential or industrial setting for one-time use or recirculation, such as for a spa or pool. The chemical is presented in a solid or granular form within the chemical dispenser and dissolves to create a solution to be introduced into the water flow stream, the chemical being of any soluble type which imparts beneficial properties to the water, such as prevention of bacterial, fungal, mold or other biological growth, reduction or control of deposits of scaling, etc.

With reference to the drawings, the invention is a chemical dispenser comprising in general a fixed base member 10, a generally cylindrical housing 20 having an open top and adapted to be joined to base member 10, and a chemical dispensing means 30 contained within housing 20. The fixed base member 10 is adapted to be connected in a water flow line, such that base member 10 is provided with an inlet opening 11, typically threaded, to receive the end of an inlet conduit 51 to deliver water or another liquid into the base member 10. Base member 10 is also provided with an outlet opening 12, also typically threaded, to receive the end of an outlet conduit 52, for delivery of the treated water or other liquid for usage. The base member 10 is provided with a depending mating means 13, such as a threaded annular flange, to matingly receive the cylindrical housing 20. The inlet opening 11 connects to an inflow conduit 14 which diverts the water flow downward through a downflow opening 15 beneath the base member 10, the downflow opening 15 being positioned to deliver the water into the interior of the cylindrical housing 20 adjacent the outer wall 21. The housing 20 is a hollow container having an outer wall 21, closed bottom 22 and open top 23, the upper portion of the housing being threaded to mate in a detachable manner with the depending flange mating means 13, the combination of base member 10 and housing 20 forming a closed system whereby the water passes from the downflow opening 15 and can only exit from the housing 20 through a centrally located upflow opening 16, which is connected to the outlet opening 12 of base member 10 by outflow conduit 17.

Centrally positioned within housing 20 is chemical dispensing means 30. Dispensing means 30 is a generally tubular member comprising three main segments, an upper conduit 31, an apertured midsection 32 and a lower chemical containing cartridge member 33. The upper conduit 31 has an open bottom 34 and an open top 35, the open top 35 being adapted to sealingly mate with the underside of the base member 10 around upflow opening 16. A gasket member 55 is preferably positioned to improve the seal between the base member 10 and upper conduit 31. The midsection 32 of the dispensing means 30 is comprised of one or more flow openings 36 which allow water to flow into the interior of upper conduit 31 and eventually out base member 10 through outlet opening 12. The total area of flow openings 36 should be of sufficient amount so as not to impede flow of water through the device. Preferably, the dispensing means 30 is of sufficient length to abut the bottom 22 of housing 20.

The lower portion of the dispensing means 30 connected to and beneath the apertured midsection 32 encompasses the chemical containing cartridge member 33, which comprises a closed bottom member 37, a side wall 38 containing at least one fluid intake refilling aperture 43 and a top member 39 containing at least one dispensing aperture 41. In the preferred embodiment, there is a single intake aperture 43 and a single dispensing aperture 41. Intake aperture 43 is positioned near the top of side wall 38, preferably adjacent the top member 39. The combination of bottom member 37, side wall 38 and top member 39 form a hollow interior 42 to receive the solid or granular chemical substance 40 to be dissolved. Intake aperture 43 is the only means for water to enter the interior 42 of chemical cartridge 33 and dispensing aperture 41 is the only means for the chemical solution 44 to exit the interior 42 of chemical cartridge 33. Dispensing aperture 41 and intake aperture 43 are sized relatively small in comparison to the interior volume of cartridge 33 and in comparison to the total area of flow openings 36 in the midsection portion 32. For example, in a dispensing means 30 having an internal diameter of approximately 1 and 1/8 inches and a cartridge height of approximately 4 and 3/4 inches, the dispensing aperture 41 in top wall 39 and the intake aperture 43 in the side wall 38 should be between approximately 1/32 and 3/16 inches in diameter, and preferably about 1/16 inches in diameter. Where multiple dispensing apertures 41 or intake apertures 43 are present, the combined total size of the openings should be in the same range. The size of the intake aperture 43 should be generally equal to the size of the dispensing aperture 41. The size of the intake aperture 43 and dispensing aperture 41 determine the feed rate, and can be varied in relation to the solubility characteristics or desirable concentrations of particular solid chemicals 40 needed for a given application.

In the most preferred embodiment, a filter means 53 of known configuration and type having a cylindrical hollow core 54 is also incorporated as part of the complete mechanism. The filter means 53 typically comprises a pleated membrane which abuts the bottom 22 of housing 20 and the bottom of base member 10, such that all water must pass through the filter means 53 before exiting the device. The chemical dispensing means 30 is positioned coaxially within the core 54, such that it is surrounded by filter means 53.

Once the invention is installed in the water flow line and water flow is initiated for the first time, the water flows through downflow opening 15 into the interior of housing 20. The housing 20 and base 10 forming a closed system, the water passes through filter means 53, if present and contacts dispensing means 30. The only available passage is through the flow openings 36 of apertured midsection 32, since the chemical cartridge 33 has a closed bottom 37 and side wall 38. As water flows into the interior of midsection 32, a small amount of water enters the intake aperture 43 in the upper portion of side wall 38 of chemical cartridge 33 and fills the upper portion of the interior 42 of the cartridge 53, dissolving a portion of the solid or granular chemical 40 contained therein. After a short period of time, the percentage of chemical 40 dissolved in the water reaches its maximum saturated value, whereby no further dissolving can occur. At this point, the concentration percentage of the solution 44 becomes steady state. As water continues to flow into housing 20, the water flows up through upper conduit 31 into upflow opening 16, then through outflow conduit 17 through outlet opening 12 and into outflow conduit 52. The relatively large volume of water flow adjacent the dispensing aperture 41 results in a pressure differential which draws a small amount of the saturated chemical solution 44 from within the cartridge 33. This chemical solution 44 is then mixed in the turbulent flow such that water flowing from the device is treated as desired.

The amount of saturated chemical solution 44 drawn through the dispensing aperture 41 is a function of aperture size, which is predetermined, and water flow rate. As water flow rate increases the pressure differential is increased and more solution 44 is drawn out and, conversely, as water flow rate decreases the pressure differential decreases and less solution 44 is drawn out. This insures that the proper amount of saturated chemical solution 44 is introduced into the water flow no matter what flow rate is present. In addition, since the amount of saturated solution 44 drawn from the chemical cartridge 33 is relatively small in comparison to the total volume of saturated solution 44, and since the water drawn into the interior 42 through intake aperture 43 is likewise of small amount relative to the total volume of the saturated chemical solution 44, the solution 44 within the cartridge 33 remains in a constant, fully saturated condition. The chemical solution 44 remains at the same concentration within the cartridge 33 no matter what amount of solid chemical 40 is present in the cartridge 33, since the chemical solution 44 is always at a saturated level. Because the refilling aperture 43 is located in the upper portion of side wall 38, the replacement water flows into the dissolved chemical solution 44 rather than into the solid or granular chemical 40, so no surging or super-saturation can occur from flow or turbulence effects within the cartridge 33. In systems which use a flow through mechanism for dissolving the chemical and do not provide for a saturated solution, the solution added to the water when the system is restarted after a stoppage period is excessively high in concentration, since the water remaining in contact with the solid chemical during the stoppage becomes saturated.

The invention can be constructed as a complete unit including base member 10, housing 20 and dispensing means 30, which is then incorporated into a water delivery system, or the dispensing means 30 can be retrofitted into existing base member 10 and housing 20 combinations.

It is contemplated that equivalents and substitutions may be apparent to those skilled in the art, and the true scope and definition of the invention therefore is to be as set forth in the following claims.

I claim:

1. A chemical dispenser for introducing a chemical solution into a flow of liquid, said dispenser comprising:

(A) a base member adapted to be incorporated into a flow conduit line, said base member having an inlet opening adapted to receive an inlet conduit, an outlet opening adapted to receive an outlet conduit, a downflow opening communicating with said inlet opening, a centrally located upflow opening communicating with said outlet opening, and mating means adapted to receive a cylindrical housing;

(B) said cylindrical housing comprising an outer wall, closed bottom and open top, and adapted to mate with said mating means of said base member;

(C) a chemical dispensing means comprising impervious an upper conduit segment, a lower chemical containing cartridge member, and an apertured midsection segment connecting said impervious upper conduit segment to said lower chemical containing cartridge member;

said upper conduit segment comprising an open top and an open bottom, said open top adapted to sealingly mate with said upflow opening of said base member;

said apertured midsection segment having at least one flow opening to allow liquid to flow into said upper conduit segment;

said cartridge member comprising a closed bottom, a side wall containing at least one intake aperture positioned in the upper portion of said side wall, and a top containing at least one dispensing aperture, said bottom, top and side wall defining an interior and containing a chemical in solid form, whereby liquid enters said cartridge member through said intake aperture and contacts said chemical to dissolve said chemical and form a saturated chemical solution within said cartridge interior, and whereby said saturated solution exits said cartridge member through said dispensing aperture in response to liquid flow through said apertured midsection and upper conduit segment.

2. The device of claim 1, where the size of said intake aperture and said dispensing aperture are small relative to the size of said at least one flow opening in said apertured midsection.

3. The device of claim 2, where said intake aperture and said dispensing aperture are between 1/32 and 3/16 inches in diameter.

4. The device of claim 1, further comprising filter means positioned within said housing and surrounding said chemical dispensing means.

5. The device of claim 4, where said filter means comprises a pleated filter having a cylindrical hollow core.

6. The device of claim 1, further comprising a gasket member positioned between said upper conduit and said base member.

7. The device of claim 1, where said intake aperture in said side wall is positioned adjacent said top of said cartridge member.

8. A chemical dispenser for use in a liquid flow conduit line comprising a base member adapted to be incorporated into said flow conduit line, said base member having an inlet opening adapted to receive an inlet conduit, an outlet opening adapted to receive an outlet conduit, a downflow opening communicating with said inlet opening, a centrally located upflow opening communicating with said outlet opening, and mating means adapted to receive a cylindrical housing, said cylindrical housing comprising an outer wall, closed bottom and open top, and adapted to mate with said mating means of said base member;

said chemical dispenser comprising an impervious upper segment, a lower chemical containing cartridge member, and an apertured midsection segment connecting said impervious upper conduit segment to said lower chemical containing cartridge member;

said upper conduit segment comprising an open top and an open bottom, said open top adapted to sealingly mate with said upflow opening of said base member;

said apertured midsection segment having at least one flow opening to allow liquid to flow into said upper conduit segment;

said cartridge member comprising a closed bottom, a side wall containing at least one intake aperture positioned in the upper portion of said side wall, and a top containing at least one dispensing aperture, said bottom, top and side wall defining an interior and containing a chemical in solid form, whereby liquid enters said cartridge member through said intake aperture and contacts said chemical to dissolve said chemical and form a saturated chemical solution within said cartridge interior, and whereby said saturated solution exits said cartridge member through said dispensing aperture in response to liquid flow through said apertured midsection and upper conduit segment.

9. The device of claim 8, where the size of said intake aperture and said dispensing aperture are small relative to the size of said at least one flow opening in said apertured midsection.

10. The device of claim 9, where said intake aperture and said dispensing aperture are between $\frac{1}{32}$ and $\frac{3}{16}$ inches in diameter.

11. The device of claim 8, further comprising filter means positioned within said housing and surrounding said chemical dispensing means.

12. The device of claim 11, where said filter means comprises a pleated filter having a cylindrical hollow core.

13. The device of claim 8, further comprising a gasket member positioned between said upper conduit and said base member.

14. The device of claim 8, where said intake aperture in said side wall is positioned adjacent said top of said cartridge member.

* * * * *